(12) United States Patent
Schulte (10) Patent No.: US 10,470,442 B2
(45) Date of Patent: Nov. 12, 2019

(54) HONEY COLLECTION AND EXTRACTION SYSTEM AND METHOD

(71) Applicant: Francis Bernard Schulte, Edmonton (CA)

(72) Inventor: Francis Bernard Schulte, Edmonton (CA)

( * ) Notice: Subject to any disclaimer, the term of this patent is extended or adjusted under 35 U.S.C. 154(b) by 270 days.

(21) Appl. No.: 15/486,712

(22) Filed: Apr. 13, 2017

(65) Prior Publication Data

US 2018/0295815 A1 Oct. 18, 2018

(51) Int. Cl.
*A01K 59/04* (2006.01)
*A01K 59/02* (2006.01)
*A01K 47/06* (2006.01)

(52) U.S. Cl.
CPC .............. *A01K 59/04* (2013.01); *A01K 47/06* (2013.01); *A01K 59/02* (2013.01)

(58) Field of Classification Search
CPC ........ A01K 59/00; A01K 59/02; A01K 59/04; A01K 59/06; A01K 47/06
See application file for complete search history.

(56) References Cited

U.S. PATENT DOCUMENTS

| 890,397 | A | | 6/1908 | Avant | |
|---|---|---|---|---|---|
| 1,776,962 | A | * | 9/1930 | Wood | A01K 59/00 210/179 |
| 2,223,561 | A | | 12/1940 | Garriga | |
| 2,631,307 | A | | 3/1953 | Sugano | |
| 3,011,646 | A | * | 12/1961 | Boronkay | A01K 59/04 210/361 |
| 3,068,496 | A | * | 12/1962 | Owens | A01K 59/02 449/55 |
| 4,310,119 | A | | 1/1982 | Culhane | |
| 9,826,721 | B2 | * | 11/2017 | Anderson | A01K 47/04 |
| 2016/0262359 | A1 | * | 9/2016 | Gouedy | A01K 59/02 |
| 2018/0139934 | A1 | * | 5/2018 | Mausner | A01K 59/04 |

\* cited by examiner

*Primary Examiner* — Kathleen I Alker
(74) *Attorney, Agent, or Firm* — Integrity Patent Group, PLC; Charles E. Runyan (57) ABSTRACT

A honey collection and extraction system includes a honey collection assembly including a housing, a helical honey frame, at least one top brood box, at least one bottom brood box, a first queen excluder, a second queen excluder and a plurality of gears; and honey extraction assembly including a helical body, a head attachment having a honeycomb cutting apparatus, an extraction pipe and a power source. The honey collection and extraction system is useful for providing improved honey collection means and a means for time efficient, no-mess honey extraction.

20 Claims, 7 Drawing Sheets

HONEY COLLECTION AND EXTRACTION SYSTEM AND METHOD

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

1. Field of the Invention

The present invention relates generally to the field of bee farming and more specifically relates to a honey collection and extraction system.

2. Description of Related Art

Today, the vast majority of beekeepers in the world use the Langstroth Hive System. The heart of this system consists of a box having removable frames with foundation, wherein each frame is spaced from one another. These frames are where the bees produce and store the honey. Honey-filled cells in the honeycomb are capped over with beeswax for storage, and in honey extraction the first step is to break or remove all of these cappings. This is typically accomplished by using a manually-operated uncapping knife. Once uncapped, the frames are then placed in a honey extractor, which spins them so that most of the honey is removed. However, the resulting honey will usually contain bits of wax and must be passed through a screen in order to filter the honey. This extraction process is messy and time consuming as there are many steps a beekeeper must follow in order to produce clean liquid honey. Further to this, the extraction process is typically performed inside a specialized room, or honey house, that can be heated to allow for faster honey flow. This again is time consuming and reduces the amount of honey that a beekeeper can produce in a day. Thus, a suitable solution is desired.

U.S. Pat. No. 4,310,119 to Vernon C. Culhane relates to a honey extractor. The described honey extractor includes a swing-type centrifugal extractor having a main body rotatable about a vertical axis which is pivotally attached to a plurality of platforms which, in the quiescent state, depend from their pivotal attachment to the body. A honey pan having an inner peripheral edge spaced above the pan bottom receives a capping catcher which includes a mesh body held within a solid frame. A fixed frame super is uncapped by severing the cappings from the super combs in a manner which allows the cappings to remain adhered to the combs by viscosity of honey. The fixed frame super is rested upon the capping catcher in the pan and the pan rests upon one of the extractor platforms. The extractor body is rotated and the platforms extend radially outward. Centrifugal force causes the severed cappings to slide from the combs and rest in the capping catcher where most of the honey is drained from them. The centrifugal force also causes extraction of honey from the honey combs. Various attachments are also provided for adapting the pan to use with movable frame combs to facilitate extraction of honey from these also.

BRIEF SUMMARY OF THE INVENTION

In view of the foregoing disadvantages inherent in the known honey collection and extraction means art, the present disclosure provides a novel honey collection and extraction system and method. The general purpose of the present disclosure, which will be described subsequently in greater detail, is to provide improved honey collection and a means for time efficient honey extraction.

A honey collection and extraction system is disclosed herein. The honey collection and extraction system includes a honey collection assembly including a housing having an internal volume, a left side, a right side, a first removable end, a second removable end, an external surface, a top surface and a bottom surface. Located within the internal volume of the housing may be a helical honey frame including a leading helical surface, a trailing helical surface opposite the leading helical surface, and a central cylindrical core. The leading helical surface and the trailing helical surface may form a male thread about the central cylindrical core.

At least one top brood box including an open bottom may be removably attached to the top surface and the external surface of the housing and at least one bottom brood box including an open top, may be removably attached to the bottom surface and the external surface of the housing. Further, a first queen excluder may be removably located between the open bottom of the at least one top brood box and the top surface and the external surface of the housing, and a second queen excluder removably located between the open top of the at least one bottom brood box and the bottom surface and the external surface of the housing. Further, a plurality of gears may be located within the housing and including a plurality of cogs configured to engage an object and rotate the object on an axis.

In addition, the honey collection and extraction system may include a honey extraction assembly including a helical body having a first end, a second end, a left side, a right side, and a female thread which may be configured to releasably mate with the male thread of the helical honey frame. The helical body may be configured to receive and retain a honeycomb. A head attachment including a honeycomb cutting apparatus and a squeegee having a smooth blade may removably attach to the first end of the helical body. An extraction pipe having a first end and a second end may be configured to receive the honey. In this embodiment, the first end may be configured to removably attach to the second end of the helical body and the second end may be configured to expel the honey. Further to this, a power source may be attached to the honey extraction assembly and configured to provide heat to the honeycomb cutting apparatus.

According to another embodiment, a bee hive is also disclosed herein. The bee hive includes a hive stand configured to support the bee hive on a ground surface and a bottom board affixed to the hive stand including an entrance for bees to enter into the hive. A lower brood box may be affixed to the bottom board, the lower brood box including a queen excluder opposite the bottom board.

Further, A cylindrical honey super may be affixed to the lower brood box, the cylindrical honey super may include a cylindrical internal volume having a center axis horizontally disposed relative to the ground surface, a leading end at a first end of the center axis, and a trailing end at a second end of the center axis, opposite the leading end, the honey super including a leading cover and a trailing cover, the leading cover configured to cover at least a portion of the leading end, and the trailing cover configured to cover at least a portion of the trailing end. A helical honey frame may be located within the cylindrical internal volume of the honey super, the helical honey frame having a leading helical surface, a trailing helical surface opposite the leading helical surface, and a central cylindrical core concentric with the center axis, the leading helical surface and the trailing helical surface forming a male thread about the central cylindrical core.

According to another embodiment, a method for honey extraction is also disclosed herein. The method for honey extraction includes heating a removable tube located within a central cylindrical core, removing the removable tube from the central cylindrical core, removing a first removable end and a second removable end from a housing of a honey collection assembly, heating at least two queen excluders, shifting the at least two queen excluders to barricade a bee's entrance into the honey collection assembly, removing a left side and a right side from the housing of the honey collection assembly to reveal the internal volume of the housing, attaching a first end of an extraction pipe to a second end of a helical body, mating the female thread of the helical body with the male thread of the helical honey frame, turning the crank arm to rotate the helical body about the central cylindrical core and through the housing, collecting the honey in a container, removing the helical body from the housing, placing the first removable end, the second removable end, the left side and the right side back onto the housing, heating the removable tube, and replacing the removable tube back into the central cylindrical core. A further step may also include removing the compressed honeycomb from the helical body.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a honey collection and extraction system and method, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to a honey collection and extraction system and more particularly to a honey collection extraction system and method as used to improve honey collection and provide a means for time efficient honey extraction.

Generally, the honey collection and extraction system may include a plastic coiled frame and a second unit used to cut honeycomb at a foundation and collect and compress the wax whilst pumping honey directly into a container. The single frame may extend over multiple beehives. The second unit may include a hot wire useful for directing the honeycomb into a wire cage. The plastic single coil frame may include three brood boxes above it and below it. The first ring of the coil frame may sit directly above the first frame of the first brood box on the bottom and the top of the first ring may fit directly under the first frame of the first top brood box. There may be 42 rings in the coil in preferred embodiments. The thickness of the plastic that makes the coil frame may be ⅛ of an inch and a honeycomb pattern may be on both sides of the plastic.

The honey collection system may include end covers that may be removed in order to extract the honey. In the middle of the end covers may be a central hub. This may be a 3 inch threaded tube which spaces the coils at the center of the frame so they are 1.5 inches apart. The center hub may be rotated into and out of the honey collector before and after collection, and the tube may be heated prior to removal with electricity. The threads of the tube may be lined with heat tape which may enable the beekeeper to easily rotate the tube into and out of the honey collector, before and after extracting the honey.

At least two queen excluders may be placed between the brood boxes and the frame unit. The queen excluders may be made out of a metal frame and a wire mesh and designed to keep the queen out of the honey chamber. The queen excluders may be ⅛ of an inch thick. An extra feature of the queen excluders may be that it may be shifted ¾ of an inch which may prevent the bees from accessing the honey chamber when collecting honey. This may be accomplished by heating the queen excluder to 120 degrees Fahrenheit with electricity.

The second unit may be an extractor. This extractor may have a similar coil shape to the frame. It may be the male to the female coil frame. The hot wire may be attached to the opening at the front of the extractor. This opening may be 1⅜ inches wide 16½ inches. Inside the extractor is a wire cage which may be spring loaded to accommodate all the wax that is compressed into it. At the other end of the extractor may be a pipe that is hooked up to a honey pump. As the extractor is rotated through the honey collector, the hot wire may cut the honey comb at the foundation. The honeycomb may then be directed into the wire cage, and the honey drained into the extractor and pumped directly into barrels. The wire cage may separate and contain the wax whilst allowing the honey to be pumped out of the honey collection assembly.

The wire cage may be formed in a sequence of symmetrical concentric rings having a diameter of 33.4 inches with a center hole that has a radius of 1.5 inches. On one of the rectangular ends there may be long narrow groves. At the other end may be corresponding ridges that would allow a head to be attached to the extracting unit. As the extractor is propelled through the honey collector, the cut honeycomb may be directed into the extractor head which may create a $3/16$ gap between the wall of the extractor and the open base of the comb.

When the extraction process is complete, the head of the extractor may be removed from the basket, and attached to a new basket to repeat the process. The hot wire may be powered with a battery housed within a tube, which may be attached to the front of the extractor. The tube may further include a control unit for the hot wire. The tube may be $2\frac{7}{8}^{th}$ inches.

Figure 1:
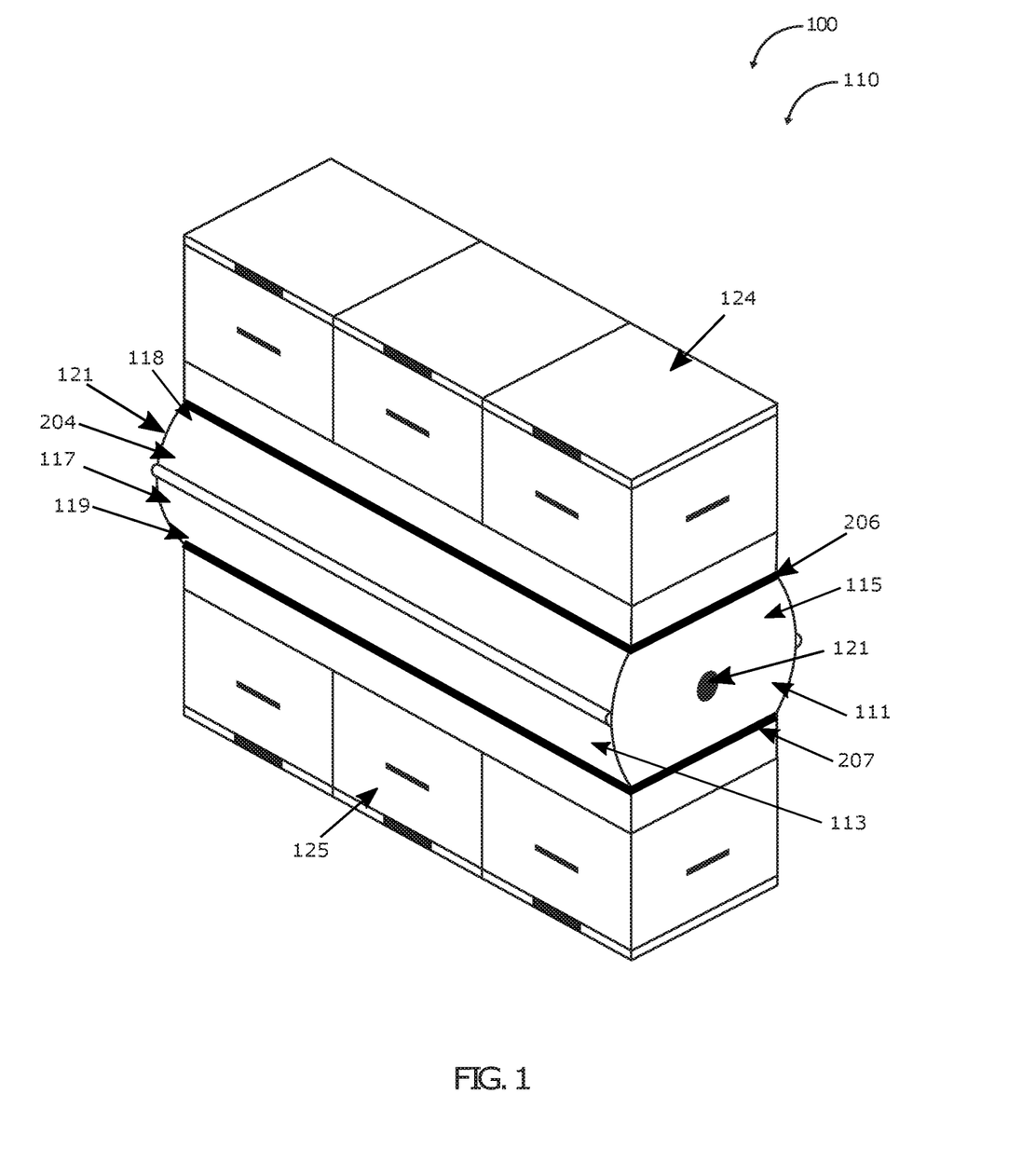
FIG. 1 is a perspective view of the honey collection and extraction system, illustrating brood boxes removably attached to a honey collection assembly, according to an embodiment of the disclosure.
Figure 2:
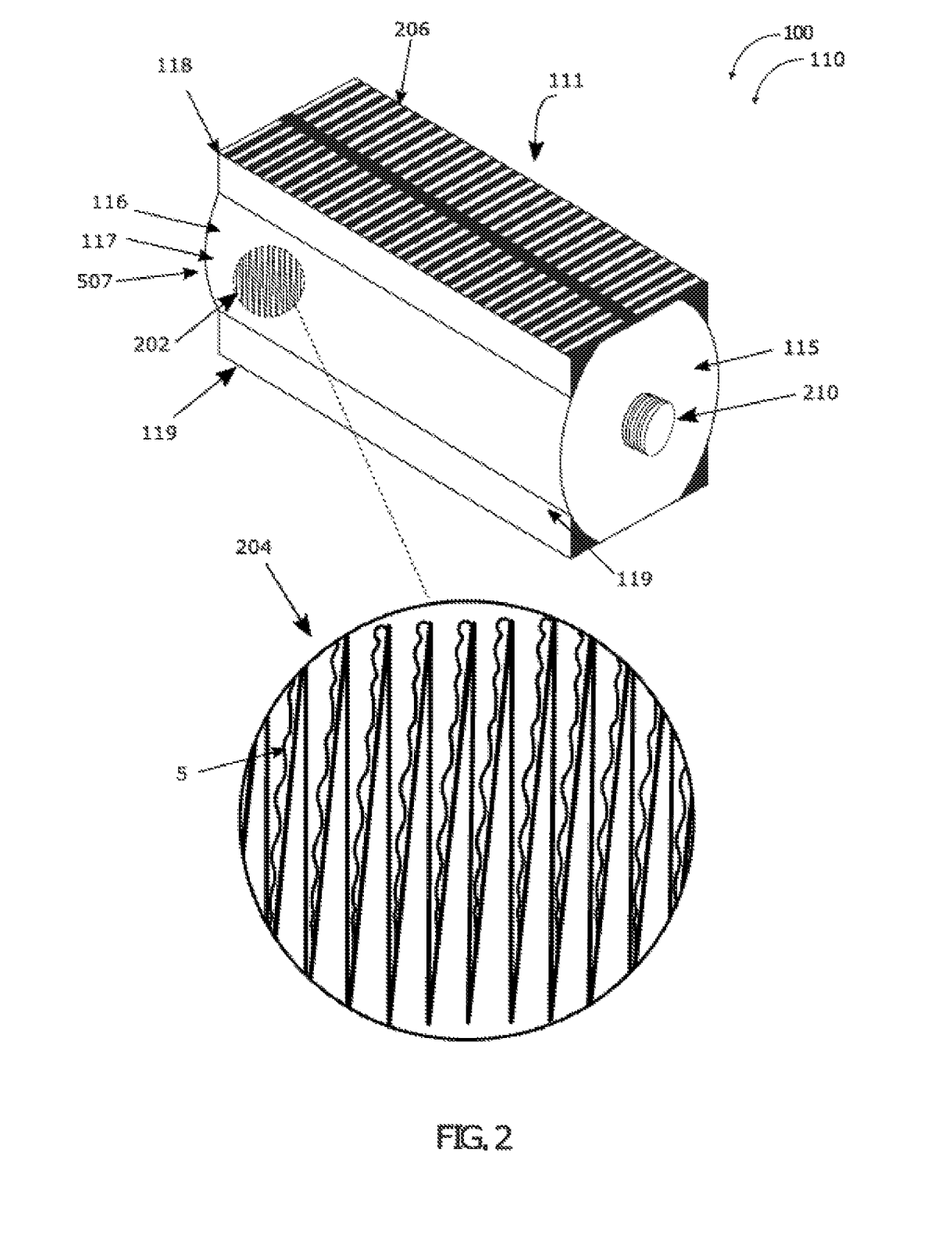
FIG. 2 is a perspective view of the honey collection and extraction system of FIG. 1, illustrating an inside view of the honey collection assembly according to an embodiment of the present disclosure.
Figures 3A, 3B:
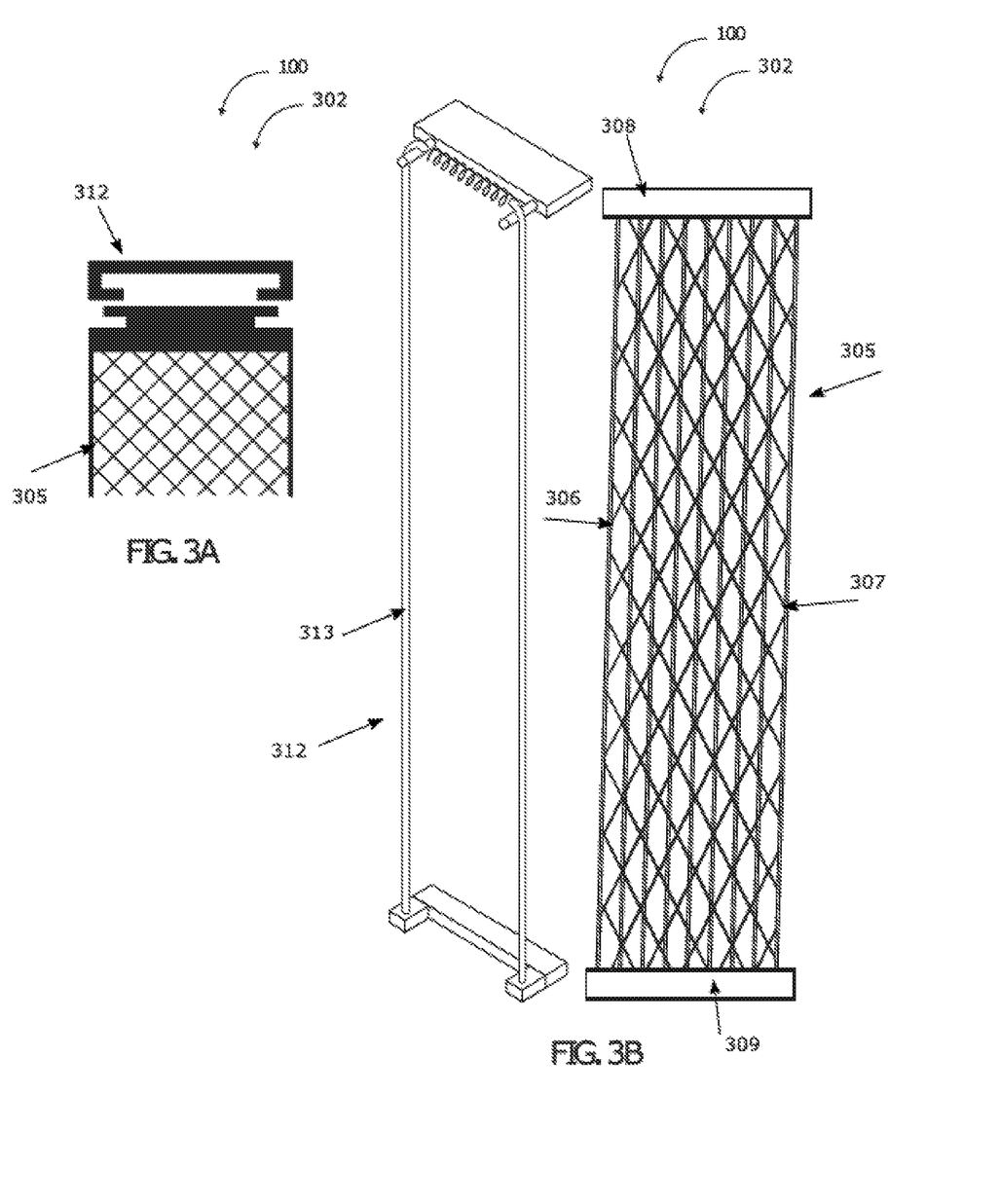
FIG. 3A is a top perspective view of the honey collection and extraction system of FIG. 1, illustrating a honey extraction assembly according to an embodiment of the present disclosure.
FIG. 3B is a perspective view of the honey collection and extraction system of FIG. 3A, according to an embodiment of the present disclosure.
Figure 4A:
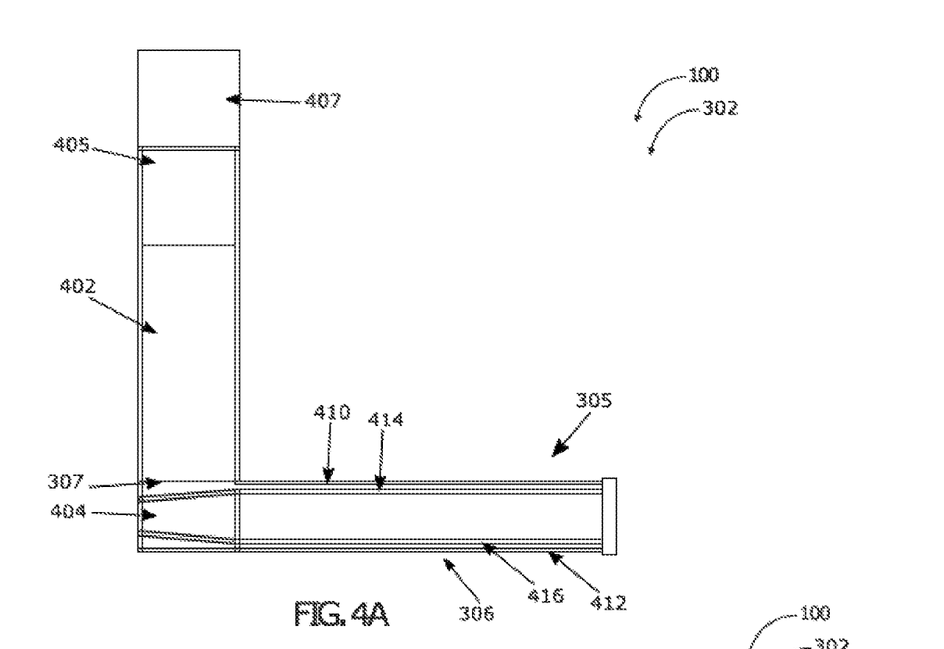
FIG. 4A is a perspective view of the honey collection and extraction system, illustrating an extraction pipe according to an embodiment of the present disclosure
Figure 4B:
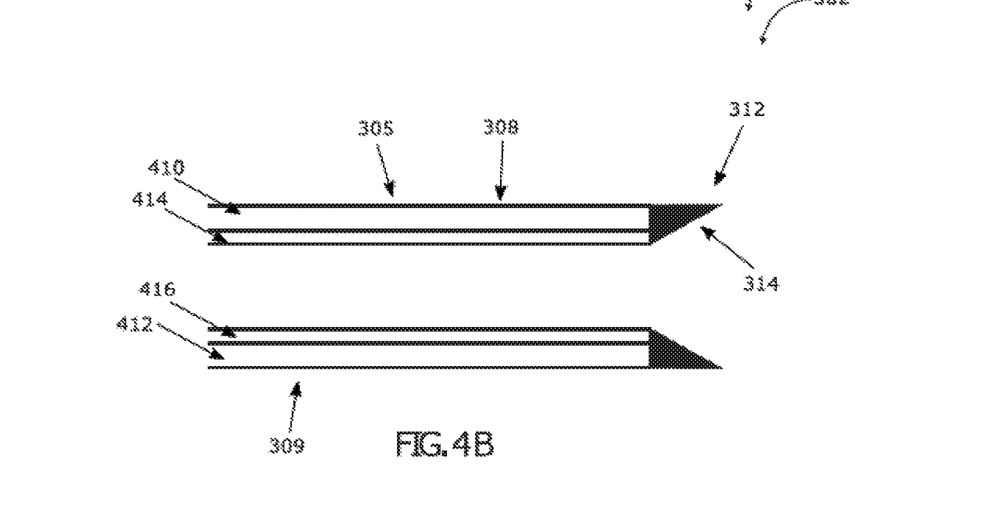
FIG. 4B is a perspective view of the honey collection and extraction system, illustrating a honey extraction assembly according to an embodiment of the present disclosure.

Referring now more specifically to the drawings by numerals of reference, there is shown in FIGS. 1-6, various views of a honey collection and extraction system 100. FIG. 1 shows a honey collection and extraction system 100 with the three brood boxes above and below it, according to an embodiment of the present disclosure. Here, the honey collection and extraction system 100 may be beneficial for use by a user to improve honey collection and provide a means for time efficient honey extraction. As illustrated, the honey collection and extraction system 100 may include a honey collection assembly 110 including a housing 111, a helical honey frame 204, at least one top brood box 124, at least one bottom brood box 125, a first queen excluder 206, a second queen excluder 207, and a plurality of gears 510 (FIG. 5); and a honey extraction assembly 302 including a helical body 305, a head attachment 312 (FIG. 3A, FIG. 3B), an extraction pipe 402, and a power source 407 (FIG. 4).

At least one top brood box 124 including an open bottom may be removably attached to the top surface 118 and the external surface 117 of the housing 111 and at least one bottom brood box 125 including an open top may be removably attached to the bottom surface 119 and the external surface 117 of the housing 111. In the preferred embodiment, there may be three top brood boxes 124 and three bottom brood boxes 125. The brood boxes 125 may be spaced 2.5 inches apart. Further, a first queen excluder 206 may be removably located between the open bottom of the at least one top brood box 124 and the top surface 118 and the external surface 117 of the housing 111, and a second queen excluder 207 may be removably located between the open top of the at least one bottom brood box 125 and the bottom surface 119 and the external surface 117 of the housing 111.

In a preferred embodiment, at least one top brood box 124 including an open bottom may be removably attached to the top surface 118 and the external surface 117 of the housing 111 and at least one bottom brood box 125 including an open top may be removably attached to the bottom surface 119 and the external surface 117 of the housing 111. In addition, a first heated queen excluder 206 may be removably located between the open bottom of the at least one top brood box 124 and the top surface 118 and the external surface 117 of the housing 111, and a second heated queen excluder 207 may be removably located between the open top of the at least one bottom brood box 125 and the bottom surface 119 and the external surface 117 of the housing 111. The first queen excluder 206 and the second queen excluder 207 may be $1/8$ of an inch thick and composed of an electrically heatable material. Further, the first queen excluder 206 and the second queen excluder 207 may be moved at least $3/4$ inch to prevent bees from entering the housing 111 when the extraction process is in progress. To accomplish this, the first queen excluder 206 and the second queen excluder 207 may be heated to at least 120 degrees Fahrenheit. The heat from the first queen excluder 206 and the second queen excluder 207 may further warm the honeycomb 5 attached to the queen excluders 206, 207 to aid in extraction.

Further, the honey collection assembly 110 may include a first receptacle including an open bottom and at least four corners, the first receptacle being removably attached to the top surface 118 and the external surface 117 of the housing 111, and a second receptacle including an open top and at least four corners, the second receptacle being removably attached to the bottom surface 119 and the external surface 117 of the housing 111. In the preferred embodiment, the first receptacle and the second receptacle may be rectangular in shape.

In this embodiment, the first queen excluder 206 may be removably located between the open bottom of the at least one top brood box 124 and the open top of the first receptacle and the second queen excluder 207 may be removably located between the open top of the at least one bottom brood box 125 and the open bottom of the second receptacle. In the preferred embodiment, the at least one top brood box 124 is three top brood boxes and the at least one bottom brood box 125 is three bottom brood boxes. The three top brood boxes and the three bottom brood boxes may be spaced 2.5 inches apart. In this embodiment, the first receptacle may be equal in length to the three top brood boxes spaced 2.5 inches apart and the housing 111, and the second receptacle may be equal in length to the three bottom brood boxes spaced 2.5 inches apart and the housing 111.

The honey collection assembly 110 may further include a first excluder housing fixedly attached to the top surface 118 of the housing 111 and configured to removably secure the first queen excluder 206 therein. Similarly, the honey collection assembly 110 may further include a second excluder housing fixedly attached to the bottom surface 119 of the housing 111 and configured to removably secure the second queen excluder 207 therein.

According to one embodiment, the honey collection and extraction system 100 may be arranged as a kit. In particular, the honey collection and extraction system 100 may further include a set of instructions. The instructions may detail functional relationships in relation to the structure of the honey collection and extraction system 100 (such that the honey collection and extraction system 100 can be used, maintained, or the like, in a preferred manner).

FIG. 2 shows the honey collection and extraction system of FIG. 1, according to an embodiment of the present disclosure. Illustrated in FIG. 2 is the honey collection assembly 110. Shown in the figure is the housing 111 partially cut away to reveal the helical honey frame 204. A closer view of the helical honey frame 204 is also shown to capture the shape of the frame and demonstrate the honeycomb 5 collected on the frame. As above, the honey collection and extraction system 100 may include a honey collection assembly 110 including a housing 111 having an internal volume 202, a left side 113, a right side 114, a first removable end 115, a second removable end 116, an external surface 117, a top surface 118 and a bottom surface 119. Located within the internal volume 202 of the housing 111 may be a helical honey frame 204 including a leading helical surface, a trailing helical surface opposite the leading helical surface, and a central cylindrical core 121.

The leading helical surface and the trailing helical surface may form a male thread about the central cylindrical core 121. The central cylindrical core 121 may include an internal female thread. In this embodiment, the honey collection assembly 110 may further include a removable tube 210 having an external male thread configured to mate with the internal female thread of the central cylindrical core 121.

In the preferred embodiment, the honey collection assembly 110 may include a housing 111 having an internal volume 202, a left side 113 and a right side 114, a first removable end 115 and a second removable end 116, an external surface 117, and a top surface 118 and a bottom surface 119. In this embodiment, the left side 113 may include two left removable panels and the right side 114 may include two right removable panels. These panels may be removed prior to extraction. A helical honey frame 204 may be located within the internal volume 202 of the housing 111. The helical honey frame 204 may have a leading helical surface, a trailing helical surface opposite the leading helical surface, and a central cylindrical core 121. Further, the leading helical surface and the trailing helical surface forming a male thread about the central cylindrical core 121. The male thread may include a pitch of at least 1.5 inches. The helical honey frame 204 may further include a honeycomb indicia on both sides. The helical honey frame 204 may further be composed of a plastic material. Other suitably equivalent materials may be used.

The central cylindrical core 121 may include an internal female thread. In this embodiment, the honey collection assembly 110 may further include a removable tube 210 having an external male thread configured to mate with the internal female thread of the central cylindrical core 121. Additionally, the removable tube 210 may be optionally heated by a battery. The removable tube 210 may further be configured to ensure the pitch of the male thread of the helical honey frame 204 stays at at least 1.5 inches. The central cylindrical core 121 may be 3 inches in diameter.

FIG. 3A is a flat perspective view of the honey extraction assembly 302, according to an embodiment of the present disclosure. Illustrated here is the helical body 305 and the head attachment 312 demonstrating how the head attachment 312 fits onto the helical body 305. As above, the honey extraction assembly 302 may include a helical body 305 having a first end 306, a second end 307, a left side 308, a right side 309, and a female thread which may be configured to releasably mate with the male thread of the helical honey frame 204. The helical body 305 may be configured to receive and retain a honeycomb 5. A head attachment 312 including a honeycomb cutting apparatus 313 and a squeegee 314 having a smooth blade may removably attach to the first end 306 of the helical body 305.

FIG. 3B is a perspective view of the honey extraction assembly 302 of FIG. 3A, illustrating the helical body 305 and the head attachment 312 in further detail. The helical body 305 may be spring-loaded and configured to compress the honeycomb 5. The left side 308 of the helical body 305 may include a first perforated plate 414 (FIG. 4) and the right side 309 of the helical body 305 may include a second perforated plate 416 (FIG. 4) configured to enable the flow of honey therethrough. In one embodiment, the helical body 305 may include a plurality of teeth 502 on an external surface 511 configured to engage with the plurality of cogs 501 on the plurality of gears 510 (FIG. 5) in the honey collection assembly 110. In this embodiment, the plurality of gears 510 in the honey collection assembly 110 may be configured to engage the helical body 305 and rotate the helical body 305 on the axis through the helical honey frame 204.

The honeycomb cutting apparatus 313 may be attached to the helical body 305 such that when the helical body 305 is rotated through the helical honey frame 204, the honeycomb cutting apparatus 313 cuts the honeycomb 5 at a base of the honeycomb 5. In this embodiment, the honeycomb cutting apparatus 313 is a wire.

In the preferred embodiment, the honey extraction assembly 302 may include a helical body 305 having a first end 306, a second end 307, a left side 308, a right side 309, and a female thread may be configured to releasably mate with the male thread of the helical honey frame 204. The helical body 305 may be configured to receive and retain a honeycomb 5. A head attachment 312 including a honeycomb cutting apparatus 313 and a squeegee 314 having a smooth blade may removably attach to the first end 306 of the helical body 305 and an extraction pipe 402 configured to receive the honey may have a first end 306 and a second end 307, the first end 306 being configured to removably attach to the second end 307 of the helical body 305 and the second end 307 being configured to expel the honey. In this embodiment, a battery may be included and configured to provide heat to the honeycomb cutting apparatus 313. The head attachment 312 may be 1⅜ inches wide×16½ inches in length. The female thread of the helical body 305 may include a diameter of at least 33 inches.

The helical body 305 may be spring-loaded and configured to compress the honeycomb 5. The left side 308 of the helical body 305 may include a first perforated plate 414 and the right side 309 of the helical body 305 may include a second perforated plate 416 configured to enable the flow of honey therethrough. The helical body 305 may have a plurality of teeth on an external surface 117 configured to engage with the plurality of cogs 501 on the plurality of gears 510 in the honey collection assembly 110. The plurality of gears 510 in the honey collection assembly 110 may be configured to engage the helical body 305 and rotate the helical body 305 on the axis through the helical honey frame 204. The central cylindrical core 121 may be the axis.

FIG. 4A is a perspective view of the honey extraction assembly 302 showing the extraction pipe 402 according to an embodiment of the present disclosure. The honey extraction assembly 302 may include the extraction pipe 402 having a first end 404 and a second end 405 may be configured to receive the honey. In this embodiment, the first end 404 may be configured to removably attach to the second end 307 of the helical body 305 and the second end 405 may be configured to expel the honey. Further to this, a power source 407 may be attached to the extraction assembly and configured to provide heat to the honeycomb cutting apparatus 313. In one embodiment, the power source 407 may be a battery. Further, the removable tube 210, the first queen excluder 206 and the second queen excluder 207 may be heated via the power source 407.

The left side 308 of the helical body 305 may include a first elongated opening 410 located between the first perforated plate 414 and an external surface 117 of the left side 308, and the right side 309 of the helical body 305 may include a second elongated opening 412 located between the second perforated plate 416 and an external surface 117 of the right side 309. In this embodiment, the first elongated opening 410 and the second elongated opening 412 may be configured to allow the honey to be suctioned into the extraction pipe 402. Further, the extraction pipe 402 may be a vacuum.

FIG. 4B is a perspective view of the honey extraction assembly 302 according to an embodiment of the present disclosure. As above the honey extraction assembly 302 may include a helical body 305, a head attachment 312 and an extraction pipe 402. The left side 308 of the helical body 305 may include a first elongated opening 410 located between the first perforated plate 414 and an external surface 117 of the left side 308. Likewise, the right side 309 of the helical body 305 may include a second elongated opening 412 located between the second perforated plate 416 and an external surface 117 of the right side 309. In this embodiment, the first elongated opening 410 and the second elongated opening 412 may be configured to allow the honey to be suctioned into the extraction pipe 402. The extraction pipe 402 may be a vacuum. The honeycomb cutting apparatus 313 may be attached to the helical body 305 such that when the helical body 305 is rotated through the helical honey frame 204, the honeycomb cutting apparatus 313 cuts the honeycomb 5 at a base of the honeycomb 5. In one embodiment, the honeycomb cutting apparatus 313 is a wire.

Figure 5:
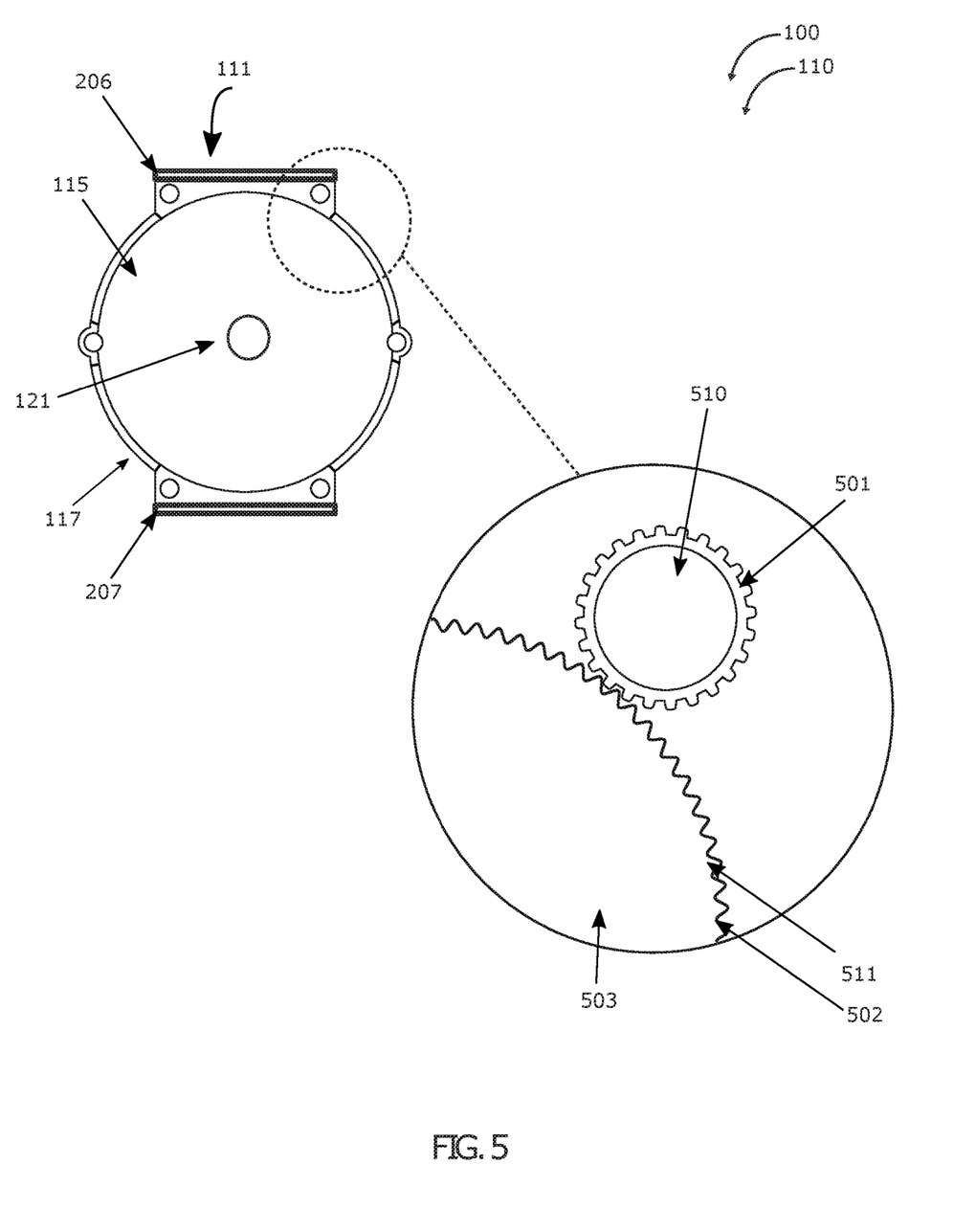
FIG. 5 is a perspective view of the honey collection and extraction system of FIG. 1, illustrating a cog according to an embodiment of the present disclosure.

FIG. 5 is a perspective view of the honey collection assembly 110 illustrating the plurality of gears 510 according to an embodiment of the present disclosure. The plurality of gears 510 may be located within the housing 111 and include a plurality of cogs 501 configured to engage an object and rotate the object on an axis.

Figure 6:
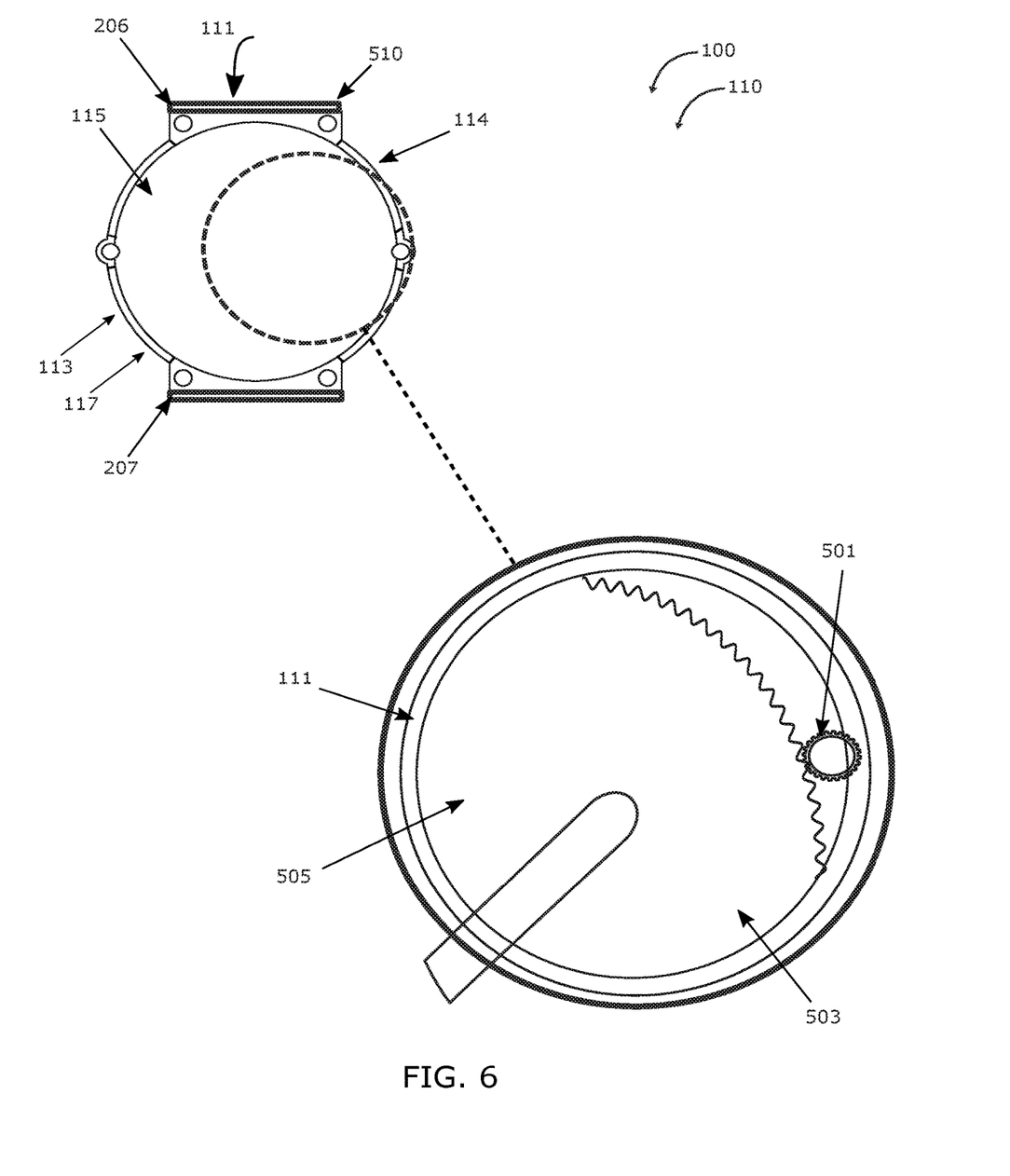
FIG. 6 is a perspective view of the honey collection and extraction system of FIG. 1, illustrating a gear wheel and crank arm according to an embodiment of the present disclosure.

FIG. 6 is a perspective view of the honey collection assembly 110 illustrating the gear wheel 503 and the crank arm 505, according to an embodiment of the present disclosure. The gear wheel 503 and the crank arm 505 may be located within the housing 111 and include a plurality of cogs 501 configured to engage an object and rotate the object on an axis.

In the preferred embodiment, the plurality of gears 510 including a plurality of cogs 501 may be configured to engage an object and rotate the object on an axis. The axis may be the central cylindrical core 121. The plurality of gears 510 may include at least four cogs 501 that run the length of the housing 111. In this embodiment, the housing 111 may include four corners at both ends and the one of the at least four cogs 501 may be located in each of the four corners. The at least four cogs 501 may be connected to a gear wheel 503 which in turn may be connected to a crank arm 505.

Figure 7:
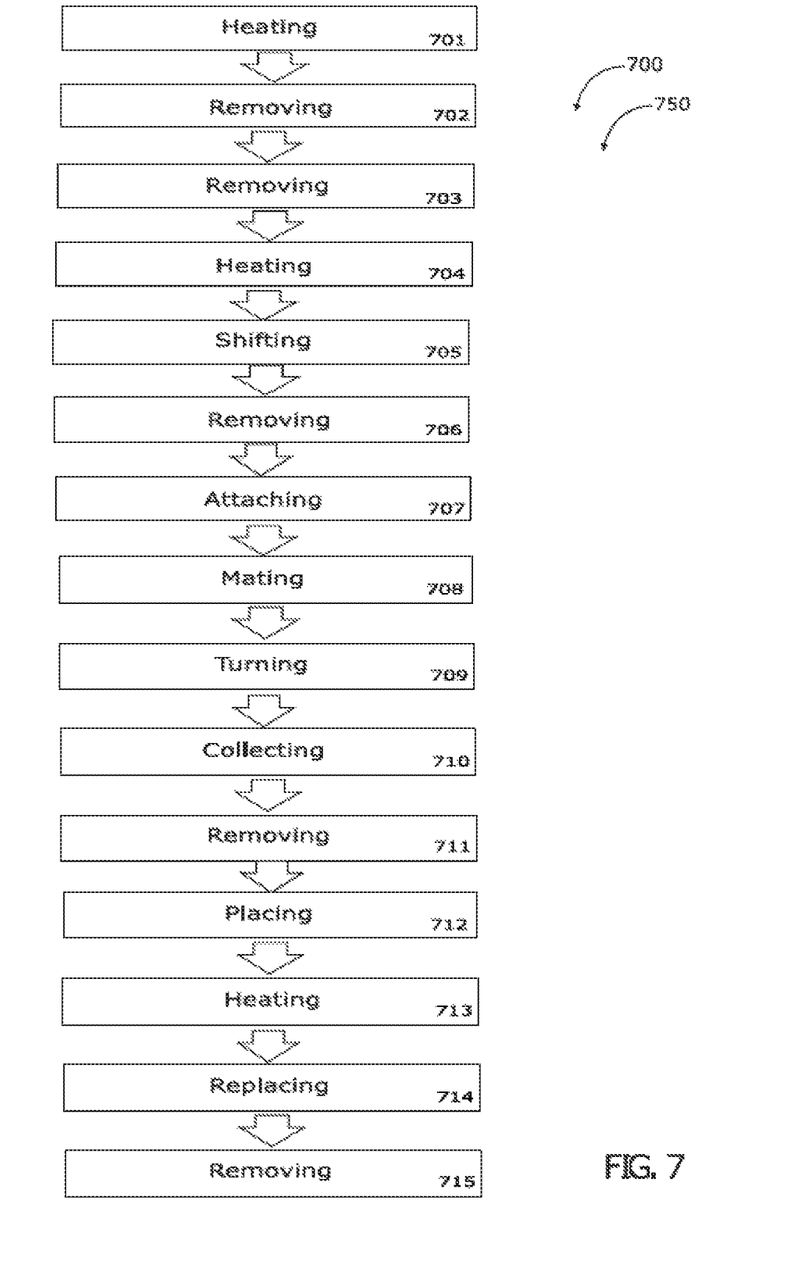
FIG. 7 is a flow diagram illustrating a method for honey extraction, according to an embodiment of the present disclosure.

FIG. 7 is a flow diagram 750 illustrating a method for honey extraction 700, according to an embodiment of the present disclosure. In particular, the method for honey extraction 700 may include one or more components or features of the honey collection and extraction system 100 as described above.

As illustrated, the method for honey extraction 700 may include the steps of: step one 701, heating a removable tube 210 located within a central cylindrical core 121 of a helical honey frame 204 (the helical honey frame 204 located within an internal volume 202 of a housing 111 of a honey collection assembly 110); step two 702, removing the removable tube 210 from the central cylindrical core 121; step three 703, removing a first removable end 115 and a second removable end 116 from the housing 111 of the honey collection assembly 110 to reveal at least two queen excluders 206, 207; step four 704, heating the at least two queen excluders 206, 207; step five 705, shifting the at least two queen excluders 206, 207 to barricade a bee's entrance into the honey collection assembly 110; step six 706, removing a left side 113 and a right side 114 from the housing 111 of the honey collection assembly 110 to reveal the internal volume 202 of the housing 111 (the internal volume 202 including the helical honey frame 204 and at least four cogs 501, the at least four cogs 501 connected to a gear wheel 503, the gear wheel 503 connected to a crank arm 505, and the helical honey frame 204 having a male thread and the central cylindrical core 121); step seven 707, attaching a first end 404 of an extraction pipe 402 to a second end 307 of a helical body 305, (the helical body 305 including a heated honeycomb 5 cutting apparatus 313, a female thread configured to releasably mate with the male thread of the helical honey frame 204, and a plurality of teeth 316 configured to engage with the at least four cogs 501 in the housing 111); step eight 708, mating the female thread of the helical body 305 with the male thread of the helical honey frame 204, and the plurality of teeth 316 of the helical body 305 with the at least four cogs 501 in the housing 111; step nine 709, turning the crank arm 505 to rotate the helical body 305 about the central cylindrical core 121 and through the housing 111, the heated honeycomb 5 cutting apparatus 313 slicing the honeycomb 5, the helical body 305 compressing the honeycomb 5, and the extraction pipe 402 suctioning honey through the central cylindrical core 121 and out through an exit 507 in the housing 111; step ten 710, collecting the honey in a container; step eleven 711, removing the helical body 305 from the housing 111; step twelve 712, placing the first removable end 115, the second removable end 116, the left side and the right side back onto the housing 111; step thirteen 713, heating the removable tube 210; and step fourteen 714, replacing the removable tube 210 back into the central cylindrical core 121. Further, step fifteen 715 may include removing the compressed honeycomb 5 from the helical body 305.

It should be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for honey extraction (e.g., different step orders within above-mentioned list, elimination or addition of certain steps, including or excluding certain maintenance steps, etc.), are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A honey collection and extraction system comprising:
  a honey collection assembly including:

a housing having an internal volume, a left side and a right side, a first removable end and a second removable end, an external surface, and a top surface and a bottom surface;

a helical honey frame located within the internal volume of the housing, the helical honey frame having a leading helical surface, a trailing helical surface opposite the leading helical surface, and a central cylindrical core, the leading helical surface and the trailing helical surface forming a male thread about the central cylindrical core;

at least one top brood box including an open bottom, the at least one top brood box being removably attached to the top surface and the external surface of the housing;

at least one bottom brood box including an open top, the at least one bottom brood box removably attached to the bottom surface and the external surface of the housing;

a first queen excluder removably located between the open bottom of the at least one top brood box and the top surface and the external surface of the housing;

a second queen excluder removably located between the open top of the at least one bottom brood box and the bottom surface and the external surface of the housing;

and a plurality of gears including a plurality of cogs configured to engage a helical body and rotate the helical body on an axis;

and a honey extraction assembly including:

the helical body having a first end, a second end, a left side, a right side, and a female thread configured to releasably mate with the male thread of the helical honey frame, the helical body configured to receive and retain a honeycomb;

a head attachment including a honeycomb cutting apparatus and a squeegee having a smooth blade, the head attachment being configured to removably attach to the first end of the helical body;

an extraction pipe configured to receive the honey, the extraction pipe having a first end and a second end, the first end of the extraction pipe being configured to removably attach to the second end of the helical body, the second end of the extraction pipe being configured to expel the honey;

and a power source configured to provide heat to the honeycomb cutting apparatus.

2. The honey collection and extraction system of claim 1, wherein the central cylindrical core includes an internal female thread.

3. The honey collection and extraction system of claim 2, wherein the honey collection assembly further includes a removable tube having an external male thread configured to mate with the internal female thread of the central cylindrical core.

4. The honey collection and extraction system of claim 3, wherein the removable tube is heated by the power source.

5. The honey collection and extraction system of claim 4, wherein the power source is a battery.

6. The honey collection and extraction system of claim 5, wherein the first queen excluder and the second queen excluder may be heated via the power source.

7. The honey collection and extraction system of claim 1, the helical body is spring-loaded and configured to compress the honeycomb.

8. The honey collection and extraction system of claim 7, wherein the left side of the helical body includes a first perforated plate and the right side of the helical body includes a second perforated plate configured to enable the flow of honey therethrough.

9. The honey collection and extraction system of claim 1, wherein the extraction pipe is a vacuum.

10. The honey collection and extraction system of claim 1, wherein the helical body has a plurality of teeth on an external surface configured to engage with the plurality of cogs on the plurality of gears in the honey collection assembly.

11. The honey collection and extraction system of claim 10, wherein the plurality of gears in the honey collection assembly are configured to engage the helical body and rotate the helical body on the axis through the helical honey frame.

12. The honey collection and extraction system of claim 11, wherein the left side of the helical body includes a first elongated opening located between the first perforated plate and an external surface of the left side.

13. The honey collection and extraction system of claim 12, wherein the right side of the helical body includes a second elongated opening located between the second perforated plate and an external surface of the right side.

14. The honey collection and extraction system of claim 13, wherein the first elongated opening and the second elongated opening are configured to allow the honey to be suctioned into the extraction pipe.

15. The honey collection and extraction system of claim 1, wherein the honeycomb cutting apparatus is attached to the helical body such that when the helical body is rotated through the helical honey frame, the honeycomb cutting apparatus cuts the honeycomb at a base of the honeycomb.

16. The honey collection and extraction system of claim 15, wherein the honeycomb cutting apparatus is a wire.

17. A honey collection and extraction system comprising:

a honey collection assembly including:

a housing having an internal volume, a left side and a right side, a first removable end and a second removable end, an external surface, and a top surface and a bottom surface;

a helical honey frame located within the internal volume of the housing, the helical honey frame having a leading helical surface, a trailing helical surface opposite the leading helical surface, and a central cylindrical core, the leading helical surface and the trailing helical surface forming a male thread about the central cylindrical core;

at least one top brood box including an open bottom, the at least one top brood box being removably attached to the top surface and the external surface of the housing;

at least one bottom brood box including an open top, the at least one bottom brood box removably attached to the bottom surface and the external surface of the housing;

a first heated queen excluder removably located between the open bottom of the at least one top brood box and the top surface and the external surface of the housing;

a second heated queen excluder removably located between the open top of the at least one bottom brood box and the bottom surface and the external surface of the housing;

and and a plurality of gears including a plurality of cogs configured to engage a helical body and rotate the helical body on an axis;
and
a honey extraction assembly including:
the helical body having a first end, a second end, a left side, a right side, and a female thread configured to releasably mate with the male thread of the helical honey frame, the helical body configured to receive and retain a honeycomb;
a head attachment including a honeycomb cutting apparatus and a squeegee having a smooth blade, the head attachment being configured to removably attach to the first end of the helical body;
an extraction pipe configured to receive the honey, the extraction pipe having a first end and a second end, the first end of the extraction pipe being configured to removably attach to the second end of the helical body, the second end of the extraction pipe being configured to expel the honey;
and
a battery configured to provide heat to the honeycomb cutting apparatus;
and
wherein the central cylindrical core includes an internal female thread and the honey collection assembly further includes a removable tube having an external male thread configured to mate with the internal female thread of the central cylindrical core, the removable tube being optionally heated by the battery;
wherein the helical body is spring-loaded and configured to compress the honeycomb;
wherein the left side of the helical body includes a first perforated plate and the right side of the helical body includes a second perforated plate configured to enable the flow of honey therethrough;
wherein the helical body has a plurality of teeth on an external surface configured to engage with the plurality of cogs on the plurality of gears in the honey collection assembly;
wherein the plurality of gears in the honey collection assembly are configured to engage the helical body and rotate the helical body on the axis through the helical honey frame;
wherein the left side of the helical body includes a first elongated opening located between the first perforated plate and an external surface of the left side, and the right side of the helical body includes a second elongated opening located between the second perforated plate and an external surface of the right side;
wherein the first elongated opening and the second elongated opening are configured to allow the honey to be suctioned into the extraction pipe, the extraction pipe being a vacuum;
wherein the honeycomb cutting apparatus is attached to the helical body such that when the helical body is rotated through the helical honey frame, the honeycomb cutting apparatus cuts the honeycomb at a base of the honeycomb;
and
wherein the honeycomb cutting apparatus is a wire.

18. The honey collection and extraction system of claim 17, further comprising set of instructions; and wherein the honey collection and extraction system is arranged as a kit.

19. A method for honey extraction, the method comprising the steps of:
heating a removable tube located within a central cylindrical core, the central cylindrical core located within a helical honey frame, the helical honey frame located within an internal volume of a housing of a honey collection assembly;
removing the removable tube from the central cylindrical core;
removing a first housing end and a second housing end from the housing of the honey collection assembly to reveal at least two queen excluders;
heating the at least two queen excluders;
shifting the at least two queen excluders to barricade a bee's entrance into the honey collection assembly;
removing a left-side housing and a right-side housing from the housing of the honey collection assembly to reveal the internal volume of the housing, the internal volume including the helical honey frame and at least four cogs, the at least four cogs connected to a gear wheel, the gear wheel connected to a crank arm, and the helical honey frame having a male thread and the central cylindrical core;
attaching a first end of an extraction pipe to a second end of a helical body, the helical body including a heated honeycomb cutting apparatus, a female thread configured to releasably mate with the male thread of the helical honey frame, and a plurality of teeth configured to engage with the at least four cogs in the housing;
mating the female thread of the helical body with the male thread of the helical honey frame, and the plurality of teeth of the helical body with the at least four cogs in the housing;
turning the crank arm to rotate the helical body about the central cylindrical core and through the housing, the heated honeycomb cutting apparatus slicing a honeycomb, the helical body compressing the honeycomb, and the extraction pipe suctioning honey through the central cylindrical core and out through an exit in the housing;
collecting the honey in a container;
removing the helical body from the housing;
placing the first removable end, the second removable end, the left side and the right side back onto the housing;
heating the removable tube;
and
replacing the removable tube back into the central cylindrical core.

20. The method of claim 19, further comprising the steps of: removing the compressed honeycomb from the helical body.

* * * * *